United States Patent
Boutaghou et al.

(10) Patent No.: US 6,639,755 B2
(45) Date of Patent: Oct. 28, 2003

(54) DUAL CENTER PAD AIR BEARING FOR IMPROVED FLYABILITY AND ALUMINA SENSITIVITY

(75) Inventors: Zine Eddine Boutaghou, Vadnais Heights, MN (US); Anthony P. Sannino, Longmont, CO (US)

(73) Assignee: Seagate Technology LLC, Scotts Valley, CA (US)

( * ) Notice: Subject to any disclaimer, the term of this patent is extended or adjusted under 35 U.S.C. 154(b) by 41 days.

(21) Appl. No.: 09/866,519

(22) Filed: May 25, 2001

(65) Prior Publication Data

US 2002/0041467 A1 Apr. 11, 2002

Related U.S. Application Data

(60) Provisional application No. 60/207,637, filed on May 25, 2000.

(51) Int. Cl.[7] .................................................. G11B 5/60
(52) U.S. Cl. .............................. 360/235.7; 360/235.8; 360/236.3
(58) Field of Search ........................... 360/235.7, 236.5, 360/235.8, 236.6, 236.3, 237, 234.7

(56) References Cited

U.S. PATENT DOCUMENTS

| | | | |
|---|---|---|---|
| 4,984,114 A | 1/1991 | Takeuchi et al. ............ 360/103 |
| 5,550,693 A | 8/1996 | Hendriks et al. ............ 360/103 |
| 6,137,656 A | 10/2000 | Levi et al. ................ 360/235.4 |
| 6,144,528 A | 11/2000 | Anaya-Dufresne et al. ....... 360/235.4 |
| 6,311,388 B1 | 11/2000 | Berg et al. ................ 29/603.12 |
| 6,188,547 B1 * | 2/2001 | Gui et al. ................. 360/236.5 |
| 6,330,133 B1 | 12/2001 | Samuelson ............... 360/243.3 |
| 6,333,835 B1 | 12/2001 | Kang et al. ............... 360/235.4 |

* cited by examiner

Primary Examiner—Robert S. Tupper (57) ABSTRACT

A disc drive includes a base, a disc stack rotatably attached to the base, and an actuator assembly. The actuator assembly also includes a load spring and an attached slider. The slider has an air-bearing surface that a leading edge, a trailing edge, and a center pad positioned near the trailing edge. A transducer is positioned within the center pad. The center pad has a channel cavity therein which is substantially parallel to the trailing edge. The channel cavity is positioned near or at the transition between the material making up the slider and an alumina portion. The channel cavity splits the center pad into a first center pad portion, and a second center pad portion. The width of the channel cavity is controlled to control the amount of movement between a substrate portion of the slider and a portion covering the trailing edge of the slider which results from annealing the slider.

14 Claims, 9 Drawing Sheets

DUAL CENTER PAD AIR BEARING FOR IMPROVED FLYABILITY AND ALUMINA SENSITIVITY

RELATED APPLICATION

This application claims the benefit of U.S. Provisional Application Ser. No. 60/207,637, filed May 25, 2000 under 35 USC119(e).

FIELD OF THE INVENTION

The present invention relates to the field of mass storage devices. More particularly, this invention relates to a disc drive which includes a slider having a dual center pad with a channel or cavity located at the interface of the ceramic and alumina interface.

BACKGROUND OF THE INVENTION

One of the key components of any computer system is a place to store data. One common place for storing data in a computer system is on a disc drive. The most basic parts of a disc drive are a disc that is rotated, an actuator that moves a transducer to various locations over the disc, and electrical circuitry that is used to write and read data to and from the disc. The disc drive also includes circuitry for encoding data so that it can be successfully retrieved and written to the disc surface. A microprocessor controls most of the operations of the disc drive as well as passing the data back to the requesting computer and taking data from a requesting computer for storing to the disc. The magnetic transducer translates electrical signals into magnetic field signals that actually record the data "bits."

The transducer is typically housed within a small ceramic block called a slider. The slider is passed over the rotating disc in close proximity to the disc. The transducer can be used to read information representing data from the disc or write information representing data to the disc. When the disc is operating, the disc is usually spinning at relatively high revolutions per minute ("RPM"). A current common rotational speed is 7200 RPM. Rotational speeds in high-performance disc drives are as high as 10,000 RPM. Higher rotational speeds are contemplated for the future.

The slider is usually aerodynamically designed so that it flies on the cushion of air that is dragged by the disc. The slider has an air-bearing surface ("ABS") which includes rails and a cavity or depression between the rails. The air-bearing surface is that surface of the slider nearest the disc as the disc drive is operating. Air is dragged between the rails and the disc surface causing an increase in pressure which tends to force the head away from the disc. Simultaneously, air rushing past the cavity or depression in the air-bearing surface produces a lower than ambient pressure area at the cavity or depression. This vacuum effect counteracts the pressure produced at the rails. The opposing forces equilibrate so the slider flies over the surface of the disc at a particular fly height. The fly height is the thickness of the air lubrication film or the distance between the disc surface and the transducing head. This film minimizes the friction and resulting wear that would occur if the transducing head and disc were in mechanical contact during disc rotation.

Information representative of data is stored on the surface of the memory disc. Disc drive systems read and write information stored on tracks on memory discs. Transducers, in the form of read/write heads attached to the sliders, located on both sides of the memory disc, read and write information on the memory discs when the transducers are accurately positioned over one of the designated tracks on the surface of the memory disc. The transducer is also said to be moved to a target track. As the memory disc spins and the read/write head is accurately positioned above a target track, the read/write head can store data onto a track by writing information representative of data onto the memory disc. Similarly, reading data on a memory disc is accomplished by positioning the read/write head above a target track and reading the stored material on the memory disc. To write on or read from different tracks, the read/write head is moved radially across the tracks to a selected target track. The data is divided or grouped together on the tracks. In some disc drives, the tracks are a multiplicity of concentric circular tracks. In other disc drives, a continuous spiral is one track on one side of a disc drive. Servo feedback information is used to accurately locate the transducer. The actuator assembly is moved to the required position and held accurately during a read or write operation using the servo information.

The best performance of the disc drive results when the slider is flown as closely to the surface of the disc as possible. In operation, the distance between the slider and the disc is very small; currently "fly" heights or head media spacing is about 0.5 micro inches. It is contemplated that smaller fly heights or head media spacing will be achieved in the future since this is one factor in achieving increased recording density.

The constant demand for increasing hard drive recording density has resulted in drastic decrease in head media spacing (HMS) over the years. Variation in the head media spacing of fly height, also termed altitude fly loss, is now an increasing source of problems due to head/media intermittent contact, especially at sub half-micro inch fly height. Intermittent contact induces vibrations detrimental to the reading/writing quality at such low fly height. Intermittent contacts may also eventually result in a head crash and total loss of data, which, of course, is very undesirable.

One source of variation in the fly height results from the alumina recession located on or near the trailing edge of the slider. Typically, the slider is formed from a wafer of silicon. The transducer or transducers (separate read and write elements) are placed onto the wafer of silicon and then encased in alumina. Once encased, the wafer is diced to form individual heads. The alumina recession is typically an inconsistent dimension for a number of reasons. This inconsistency between various heads leads to inconsistency in fly heights or pole tip fly heights which leads to inconsistent results during reading and recording of information representing data.

In addition, the interface between the alumina and the substrate typically includes the closest point between the slider and the disc when the slider is passing over the surface of the disc in transducing relation. As a result, if there is any variation in the fly height, this closest point is a likely contact point between the slider and the disc.

What is needed is a slider air-bearing design for low altitude sensitivity. What is also needed is a design for controlling the alumina recession so that it is less variable and more consistent. In addition, there is a need for a slider air-bearing design that moves the closest point to another area of the slider so that in the presence of fly height variance, there will be more leeway before contact between the slider and the disc. The result is more consistent read and write performance characteristics amongst the heads in a disc drive as well as a design that is not as sensitive to the amount of alumina recession at the interface between the alumina and the slider.

SUMMARY OF THE INVENTION

An information handling system, such as a disc drive, includes a base, a disc stack rotatably attached to the base, and an actuator assembly movably attached to the base. The actuator assembly also includes a load spring and a slider attached to said load spring. The slider has an air-bearing surface. The air-bearing surface includes a leading edge, a trailing edge, and a center pad positioned near the trailing edge. A transducer is positioned within the center pad. The center pad has a channel or cavity therein. The channel or cavity is substantially parallel to the trailing edge. The channel or cavity positioned near the transducer. The center pad includes a substrate portion, and a portion covering the trailing edge of the slider which substantially encapsulates the transducer. A transition portion is located between the substrate portion and the portion covering the trailing edge. The channel or cavity is positioned near or at the transition portion. In one embodiment of the invention, the channel or cavity has a depth substantially equal to the height of the center pad. The cavity or channel substantially splits the center pad into a first center pad portion, and a second center pad portion. The first center pad portion is located toward the leading edge, and the second center pad portion is located toward the trailing edge. In some embodiments, the width of the channel or cavity is controlled to control the amount of pressure produced by the second center pad portion. In other embodiments, the dimensions of the channel or cavity are controlled to control the amount of movement between the substrate portion of the slider and the portion covering the trailing edge of the slider which results from annealing the slider. The air-bearing surface also has a first side rail located between the leading edge and the trailing edge, and a second side rail located between the leading edge and the trailing edge. The invention includes the slider as well as the slider in combination with the disc drive.

Advantageously, slider having a dual center pad with a channel or cavity having an optimized width X has low altitude sensitivity. The design controls the alumina recession so that it is less variable and more consistent. The slider air-bearing design also moves the closest point to another area of the slider so that in the presence of fly height variance, there is more leeway before contact between the slider and the disc. The result is more consistent read and write performance characteristics amongst the heads in a disc drive as well as a design that is less sensitive to the amount of alumina recession at the interface between the alumina and the slider.

DESCRIPTION OF THE PREFERRED EMBODIMENT

In the following detailed description of the preferred embodiments, reference is made to the accompanying drawings which form a part hereof, and in which are shown by way of illustration specific embodiments in which the invention may be practiced. It is to be understood that other embodiments may be utilized and structural changes may be made without departing from the scope of the present invention.

Figure 1:
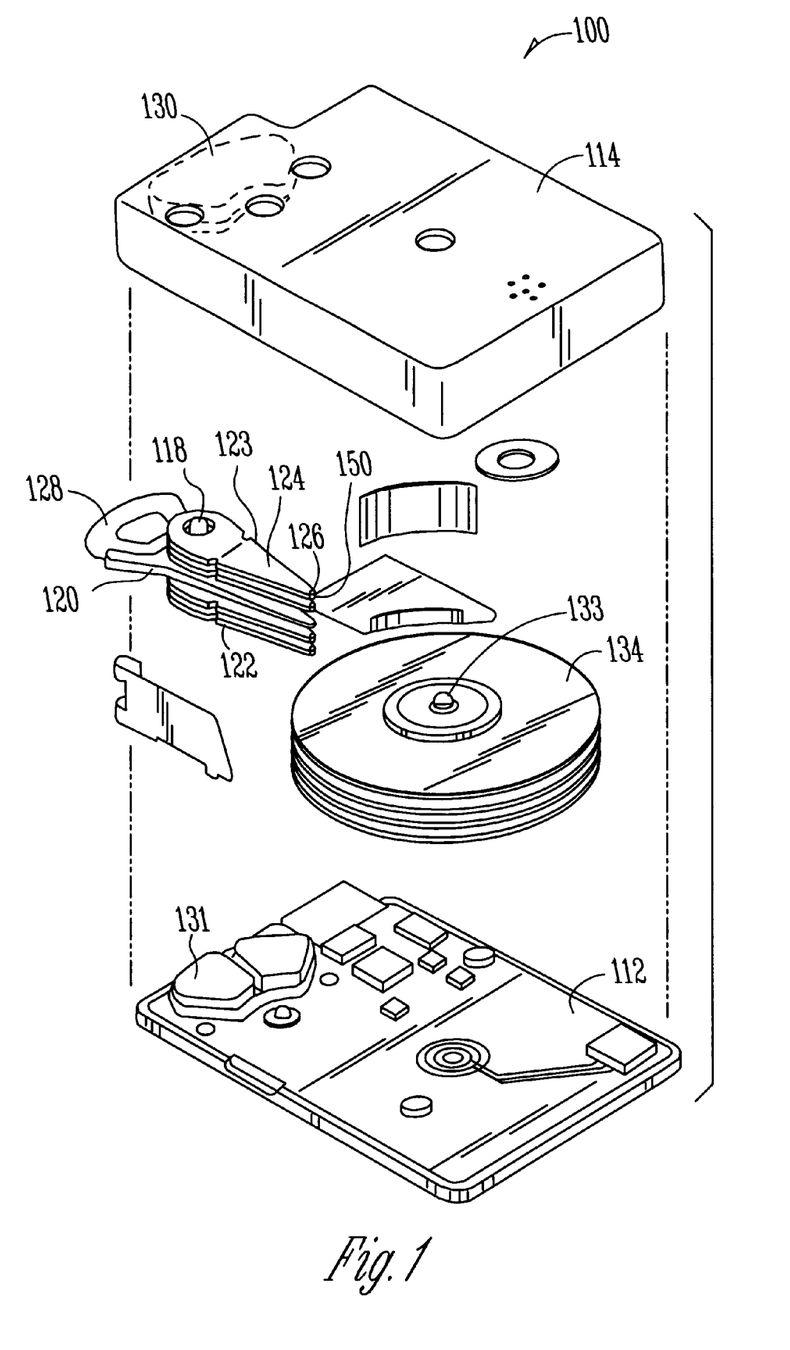
FIG. 1 is an exploded view of a disc drive with a multiple disc stack.

The invention described in this application is useful with all mechanical configurations of disc drives having either rotary or linear actuation. In addition, the invention is also useful in all types of disc drives including hard disc drives, zip drives, floppy disc drives and any other type of drives where unloading the transducer from a surface and parking the transducer may be desirable. FIG. 1 is an exploded view of one type of a disc drive 100 having a rotary actuator. The disc drive 100 includes a housing or base 112, and a cover 114. The base 112 and cover 114 form a disc enclosure. Rotatably attached to the base 112 on an actuator shaft 118 is an actuator assembly 120. The actuator assembly 120 includes a comb-like structure 122 having a plurality of arms 123. Attached to the separate arms 123 on the comb 122, are load beams or load springs 124. Load beams or load springs are also referred to as suspensions. Attached at the end of each load spring 124 is a slider 126 which carries a magnetic transducer 150. The slider 126 with the transducer 150 form what is many times called the head. It should be noted that many sliders have one transducer 150 and that is what is shown in the figures. It should also be noted that this invention is equally applicable to sliders having more than one transducer. Also attached to the load spring is a load tang 152. The load tang 152 is used for loading sliders 126 to the disc 134 and unloading the sliders 126 from the disc. On the end of the actuator arm assembly 120 opposite the load springs 124 and the sliders 126 is a voice coil 128.

Attached within the base 112 is a pair of magnets 130 and 130'. The pair of magnets 130 and 131, and the voice coil 128 are the key components of a voice coil motor which applies a force to the actuator assembly 120 to rotate it about the actuator shaft 118. Also mounted to the base 112 is a spindle motor. The spindle motor includes a rotating portion called the spindle hub 133. In this particular disc drive, the spindle motor is within the hub. In FIG. 1, a number of discs 134 are attached to the spindle hub 133. In other disc drives a single disc or a different number of discs may be attached to the hub. The invention described herein is equally applicable to such other disc drives.

Moving the actuator assembly 120 moves all the load springs 124 in unison. In operation, the actuator assembly 120 is moved to a park position when the disc drive is powered down. In a disc drive having a ramp, the actuator moves the transducers to the outer diameter where a ramp is positioned. A portion of the actuator assembly contacts the ramp resulting in the sliders being unloaded from the disc. Once the actuator assembly 120 has moved the sliders 126 to the park position the drive is powered down. When the disc drive is powered on, the discs 134 are quickly accelerated to a speed where the relative velocity between the sliders 126 and the disc 134 would cause the slider to lift off the surface of the disc 134. When operations resume, the actuator is moved toward the disc. The sliders and transducers are placed in transducer relation to the disc or is loaded onto the disc. The actuator assembly 120 can be used to move the sliders 126 into an operating or transducing position over the area of the disc used to store information representative of data. The actuator assembly 120 can also be used to perform seeks to various data locations on the surface of the disc.

Figure 2:
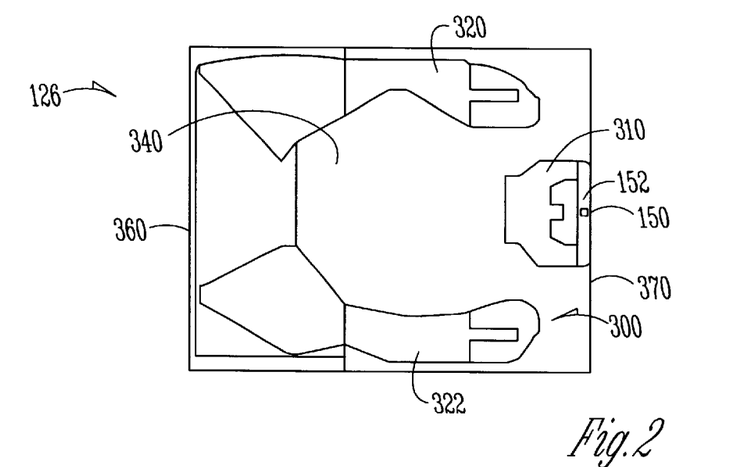
FIG. 2 is a bottom view of a slider showing the air-bearing surface of a prior art device having a single center pad.

In a disc drive which uses contact start stop the actuator assembly 120 moves the sliders to a non data area which is typically located at the inner diameter of the disc 134. The disc drive is then powered down. At power down, the sliders eventually contact the disc and slide to a halt. When powered up, the sliders slide on the disc 134 until the relative velocity between the slider 126 and disc 134 produces a lift force adequate to allow the slider 126 to fly. FIG. 2 is a bottom view of a slider 126 showing an air-bearing surface 300. The air-bearing surface includes a single center pad 310, a first side rail 320 and a second side rail 322. The air-bearing surface 300 includes contact portions which contact the disc 134 during take-off and landing of the slider 126 and non-contact portions which do not normally contact the disc 134. The center pad 310 and side rails 320 and 322 are contact portions. A single-level cavity 340 is typically formed between the side rails 320 and 322 as well as the center pad 310. The single-level cavity 340 is a non-contact portion of the air-bearing surface 300. The slider also has a leading edge 360 and a trailing edge 370. Positioned at or near the trailing edge 370 is the transducer 150. As shown in FIG. 2, the transducer fits within a slot 152 within the single center pad 310.

Figure 3:
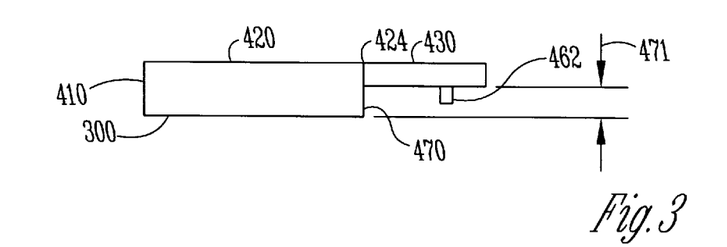
FIG. 3 is a schematic side view of a single center pad of a slider.
Figure 4:
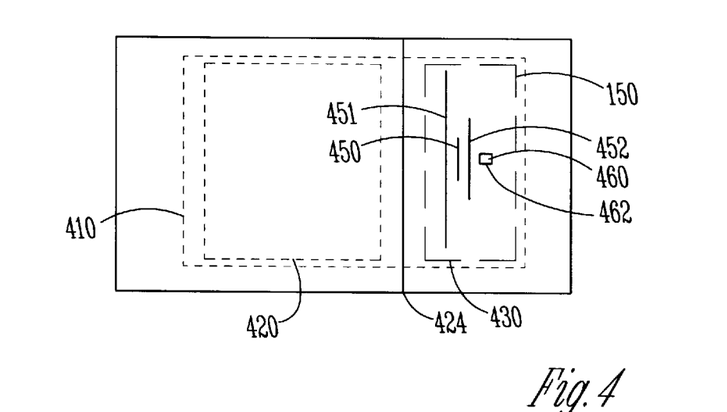
FIG. 4 is a schematic bottom view of a single center pad.

FIGS. 3 and 4 are schematic views of a single center pad 410. FIGS. 3 and 4 show the details of the single center pad 410. The single center pad 410 can be thought of as having a first portion 420 and a second portion 430. The first portion 420 of the single center pad 410 is part of a substrate of the entire slider 126. The substrate of the slider is typically made of a ceramic material. The second portion 430 of the single center pad 410 is comprised of a material different than the substrate or different than the first portion 420. Typically the second portion of the center pad 410 is comprised of alumina. Located between the first portion 420 and the second portion 430 of the single center pad 410 is an alumina substrate interface 424. Located within the alumina is the transducer 150. In this particular instance the transducer 150 is surrounded by a dotted box. Since there is more than one element to this particular read-write transducer 150 the transducer 150 includes a read element 450 which is typically bordered by a first shield 451 and a second shield 452. In this particular instance the read element is a magneto-resistive ("MR") element. The shields 451, 452 are used to prevent or direct magnetic flux that may be introduced near the MR element from being placed in the MR element. A write element 460 is positioned near the second shield 452. The write element is typically a thin film head which is placed on the back edge of the slider. The thin film head includes a pole tip 462. During operation the write element 460 produces a magnetic flux at the pole tip 462 which is generally much higher than the magnetic flux read by the read element from the disc. The shields 451 and 452 redirect any flux from the write element that may otherwise pass into the MR element. The transducer 150 structure, including a first shield 451 and a second shield 452 and the MR element 450 and the write element 460 are typically formed on the trailing edge of the slider using various deposition techniques. Once the basic structure is formed it is encased in alumina or encapsulated in alumina. Typically the alumina encapsulates most of the structure and leaves the pole tip 462 protruding from the bottom of the alumina. The process of encapsulating the transducer 150 in the alumina is what forms the second portion 430 of the single center pad 410. The alumina is said to be recessed from the air-bearing surface 300 of the first portion 420 of the single center pad 410. The amount of difference in the levels of the air-bearing portion 300 of the second portion 430 and the air-bearing portion of the first portion 420 form what is known as the alumina recession 470.

Figure 5:
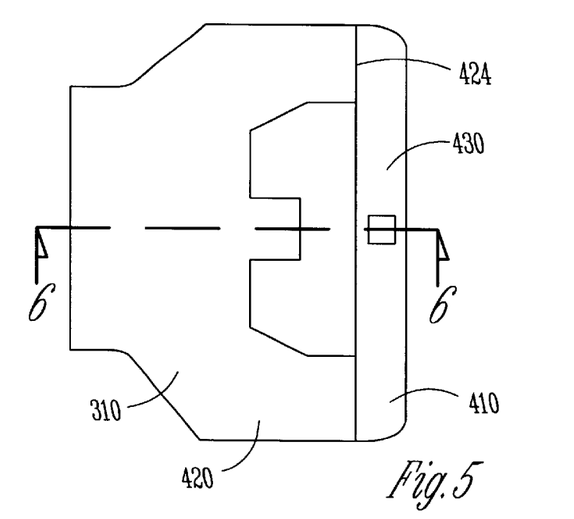
FIG. 5 is a bottom view of the single center pad of a slider of FIG. 3.
Figure 6:
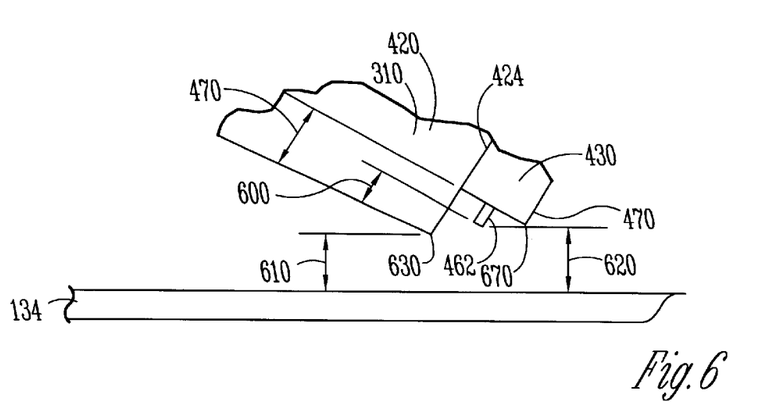
FIG. 6 is a schematic side view of a single center pad of FIG. 5 along line 6—6 which shows the location of the mechanical close point and the clearance between that point and the disc and the pole tip fly height of the transducer.

FIG. 5 is a bottom view of the single center pad 310 of a slider 126 as shown in FIG. 3 and FIG. 6 is a schematic side view of a single center pad 310 along line 66 of FIG. 5. In FIG. 6 the single center pad is at an attitude or tilted with respect to the disc 134. The attitude of the slider is exaggerated in this particular schematic diagram. When the slider and the center pad 310 are at an attitude as is shown in FIG. 6 it can be seen that the alumina recession 470 and specifically the second portion of the center pad 430 is more closely spaced to the disc drive 134 than if the center pad 310 is substantially parallel to the surface of the disc 134. By flying at an attitude or tipped up slightly, as shown in FIG. 6, the second portion 430 of the single center pad 310 becomes a factor in determining how high the slider will fly above the disc 134. As can be seen in FIG. 6 the second portion 430 of the center pad 310 has a corner 670 at the trailing edge 470 of the slider which is very nearly as closely spaced to the disc 134 as the first portion 420 of the single center pad 310. In other words, the first portion 420 of the single center pad 310 also has a corner 630 which is near the disc 134 when flying or passing over the disc 134 in transducing relation with the disc 134. The distance between the corner 630 and the disc 134 is the mechanical close point clearance 610 as depicted by arrow 610. The corner 670 of the second portion 430 of the center pad 310 is also very close to the disc 134 although it is not as close as the mechanical close point 630. Even though it is not quite as close, both corner 630 and 670 of the center pad 310 are high pressure points since the gas, such as air, is compressed at the close corners 630 and 670 during flight of the slider 126 and the center pad 310, which is of course attached to the slider 126.

Controlling the exact distance of the alumina recession 470 is difficult given the very small spacing and different methods of manufacture that may add up to allow the alumina recession 470 to vary. Alumina variation is detrimental to the head/disc interface because it introduces larger variability in fly height. In other words, different sliders may have different distances for the alumina recession 470 between the first portion 420 of the center pad 310 and the second portion 430 of the center pad 310. As can be seen from FIG. 6, differences in the distance of the alumina recession 470 may produce a wide variation in pressure at or near the transducer and specifically the pole tip 462. The difference in pressure or variability in pressure results in larger variability in the fly height for sliders of a particular design. When sliders included in the low end of the fly height spectrum are encountered, there is an increased chance for head or slider 126 to media or disc 134 contact. Such contact may cause a head crash and therefore result in data which is unrecoverable. This of course is very undesirable in a device that is supposed to store data reliably.

To decrease the variation in the alumina recession 470, the slider 126 with the center pad 310 having a first portion 420 and a second portion 430 could be annealed. The annealing process would decrease the alumina recession nominal value and variability around the nominal value. In other words, an annealing operation reduces the variability in the alumina recession distance 470. The annealing operation decreases the amount of internal stresses within the slider.

Figure 7:
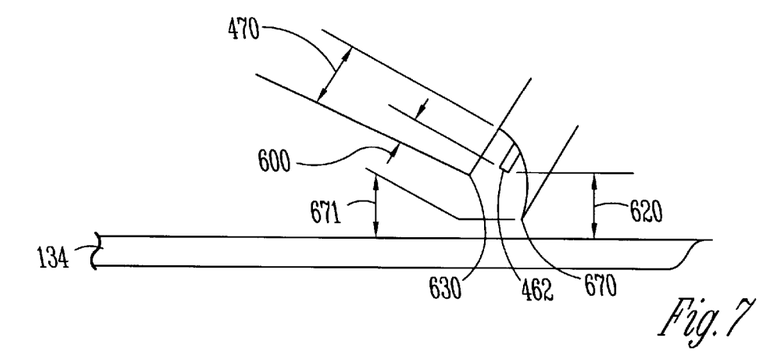
FIG. 7 is a schematic side view of a single center pad of similar to the one shown in FIG. 6 which shows the effect of annealing the slider which shifts the alumina material and changes the location of the mechanical close point.

The result of annealing is shown in FIG. 7. FIG. 7 is a schematic side view of a single center pad 310 similar to the one shown in FIG. 6, which shows the effect of annealing the slider 126. More specifically, FIG. 7 shows the effect of annealing on the center pad 310. The result of annealing the slider would shift the alumina portion or the second portion 430 of the center pad 310 and change the location of the mechanical close point. Since the alumina or second portion 430 of the center pad 310 was not uniformly constrained, the end result was what is known as the ski jump effect. In other words, the boundary conditions from one side of the second portion were dissimilar. Since one side of the second portion 430 was attached to the substrate or first portion of the center pad 310 and the other side of the second portion 430 was free. As a result the free end moves and the corner 670 became most closely positioned to the disc 134. In other words corner 670 became a new mechanical close point clearance value 671, which was smaller than the previous mechanical close point clearance 610. With a closer mechanical close point clearance 671 the budget or the amount of fly height variation that could be tolerated was drastically reduced.

Figure 8:
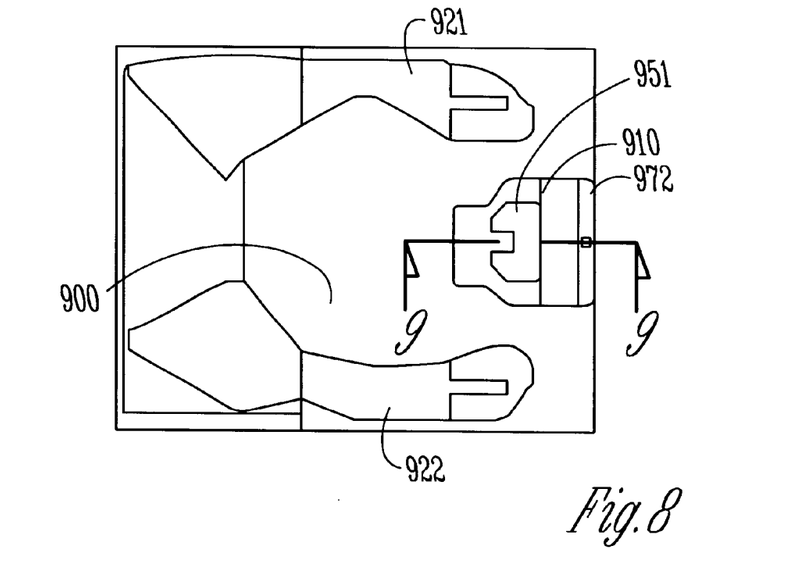
FIG. 8 is a bottom view of a slider of the present invention in which there is a dual center pad.
Figure 9:
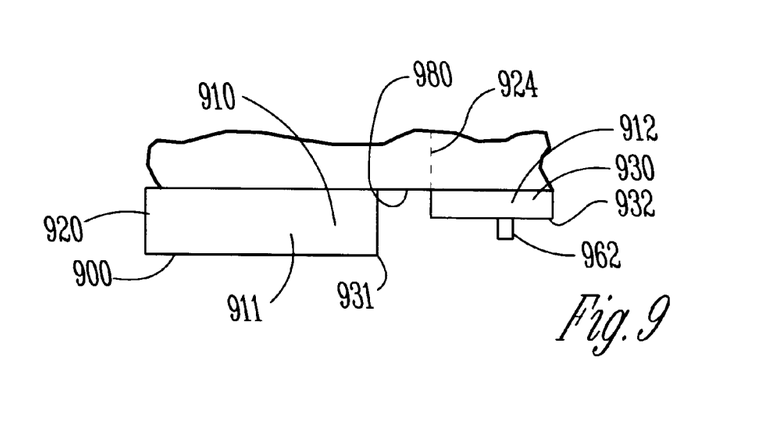
FIG. 9 is a schematic cutaway side view of the dual center pad of the slider air-bearing surface shown in FIG. 8.

FIGS. 8 and 9 show a preferred embodiment of this invention. FIG. 8 is a bottom view of a slider of the present invention in which there is a dual center pad 910. FIG. 9 is a schematic cut away of the dual center pad along line 9—9 in FIG. 8. The dual center pad is comprised of a first portion 920 which is the same as the substrate of the slider 126. The first portion 920 of the dual center pad 910 is typically made of ceramic material. The dual center pad also has a second portion 930 which is typically alumina which is used to encapsulate the transducer 150 (shown on FIG. 4). The dual center pad 910 differs from the single center pad 310, 410 in that a channel or cavity 980 is formed between the first portion 920 and the second portion 930 of the center pad. This channel or cavity may also be referred to as channel cavity 980. The channel cavity 980 essentially spits a single center pad into the dual center pad 910 having the first portion 920 and the second portion 930. The channel cavity 980 is milled at step level or cavity level between the first transducer shield 451 and the alumina/substrate interface 924. The channel cavity 980 splits the dual center pad 910 into a first center pad 911 and a second center pad 912. The first center pad 911 has a corner or edge 931. The second center pad 912 has a corner 932.

Figure 10:
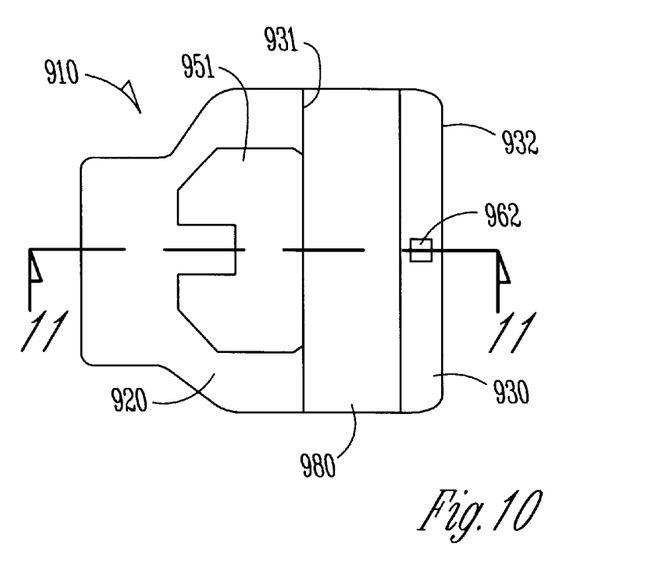
FIG. 10 is a bottom view of the dual center pad of a slider.
Figure 11:
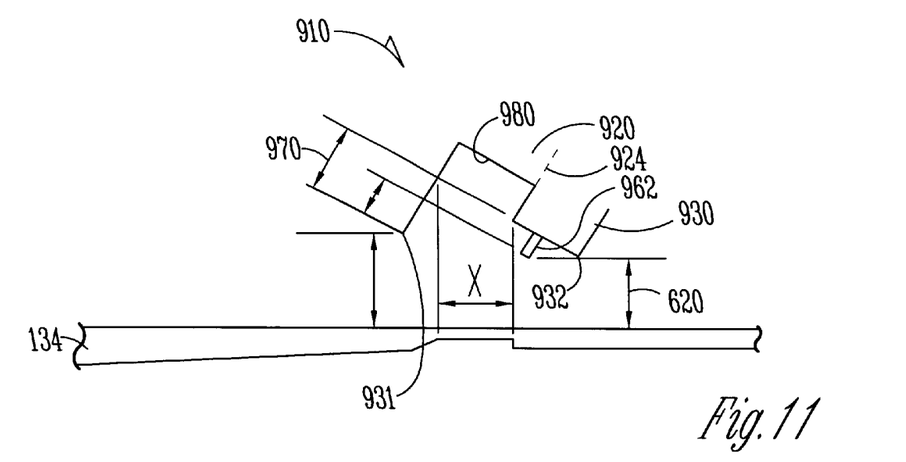
FIG. 11 is a schematic side view of a dual center pad of FIG. 10 along line 11—11 which shows the location of the mechanical close point and the clearance between that point and the disc and the pole tip fly height of the transducer.

Now turning to FIGS. 10 and 11, the effects of forming the dual center pad 910 with the channel cavity 980 will be discussed. FIG. 10 is a bottom view of the dual center pad 910 of the slider. In FIG. 11 is a schematic side view of the dual center pad 910 at an attitude associated with the slider 126 when in transducing relation with the disc 134. As shown in FIG. 11, one of the effects of adding the channel cavity 980 that forms the dual center pad 910 structure including a first pad 911 and a second pad 912 is that the mechanical close point is shifted from one of the corners 931, 932 to the pole tip 962. This enables the air bearing to be designed in such a fashion that the pole tip 962 flies lower or closer to the media or disc 134 while the mechanical separation between the slider 126 and the disc is maintained more or less constant. Put another way, the mechanical head/media separation budget is maintained constant or it is improved for a particular given pole tip fly height 620. In essence, by adding the channel cavity 980 to form a dual center pad 910 structure, the mechanical close point becomes the corner 932 of the second center pad 912. The pole tip fly height 620 is approximately equal to the distance between the corner 932 and the media or disc 134. In essence, the mechanical close point is equated to the pole tip fly height 620 by implying a channel cavity 980. The channel cavity 980 moves the corner 931 of the first portion 922 or the corner 931 of the first center pad 911 to a greater distance away from the disc 134.

Another result is that the pole tip fly height sensitivity to the alumina recession distance 970 is reduced. The channel cavity 980 positioned before the second pad 912 produces a slight negative pressure portion which counteracts the high pressure found near the pole tip 962 and the corner or edge 932 of the second center pad 912. As a result, during operation the pole tip 962 flies at a more even distance above the surface of the disc 134. This is desirable since the amount of magnetization depends upon the distance between the pole tip and the media or disc 134. The more uniform the magnetization the easier it is to read the information stored on the disc. In addition the channel cavity also acts to suppress the ski jump effect which was described in FIG. 7. The ski jump effect is a function of having one side of the alumina portion or second portion 920 constrained while the other side is free. By adding the channel cavity 980 a portion of one of the attached sides is now freed or unconstrained. This reduces the ski jump effect.

As shown in FIGS. 10 and 11 the channel cavity 980 has a width X. The actual width X was found to have an effect on the pole tip fly height to alumina recession variation. An analysis of the pole tip fly height to alumina recession variation was performed for air bearings with dual center pads at various distances between the first pad 911 and the second pad 912. Each of the particular air bearings was optimized from the inner diameter to the outer diameter for a given hard drive platform configuration.

Figure 16:
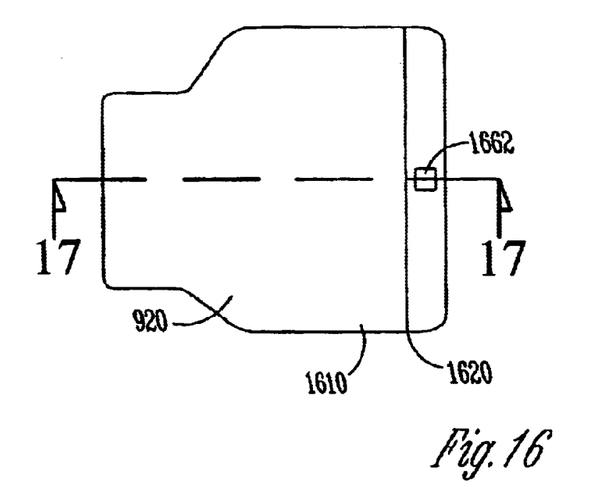
FIG. 16 is a bottom view of the single center pad of a slider.
Figure 17:
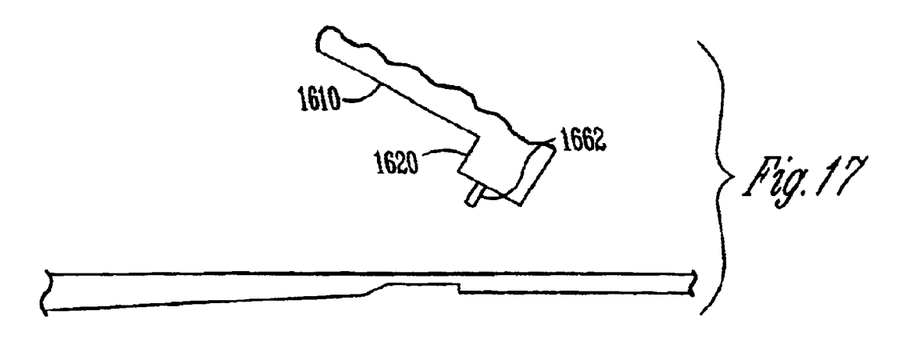
FIG. 17 is a schematic side view of a single center pad of FIG. 16 along line 17—17 which shows the location of the mechanical close point and the clearance between that point and the disc and the pole tip fly height of the transducer.

It should be noted that even though the center pads shown in FIGS. 8–11 show a trench 951 which is a u-shaped object that includes an open end directed toward the leading edge of the air bearing, this invention works equally well for an air bearing surface having a center pad without a trench. A channel cavity could be used on a center pad without a trench 951. In addition, a step having one edge near the substrate and alumina interface is also within the scope of the invention. FIGS. 16 and 17 show this arrangement. The center pad includes a step 1610 which occurs at the substrate and alumina interface 1620. The pole tip 1662 is on the unstepped surface.

Figure 12:
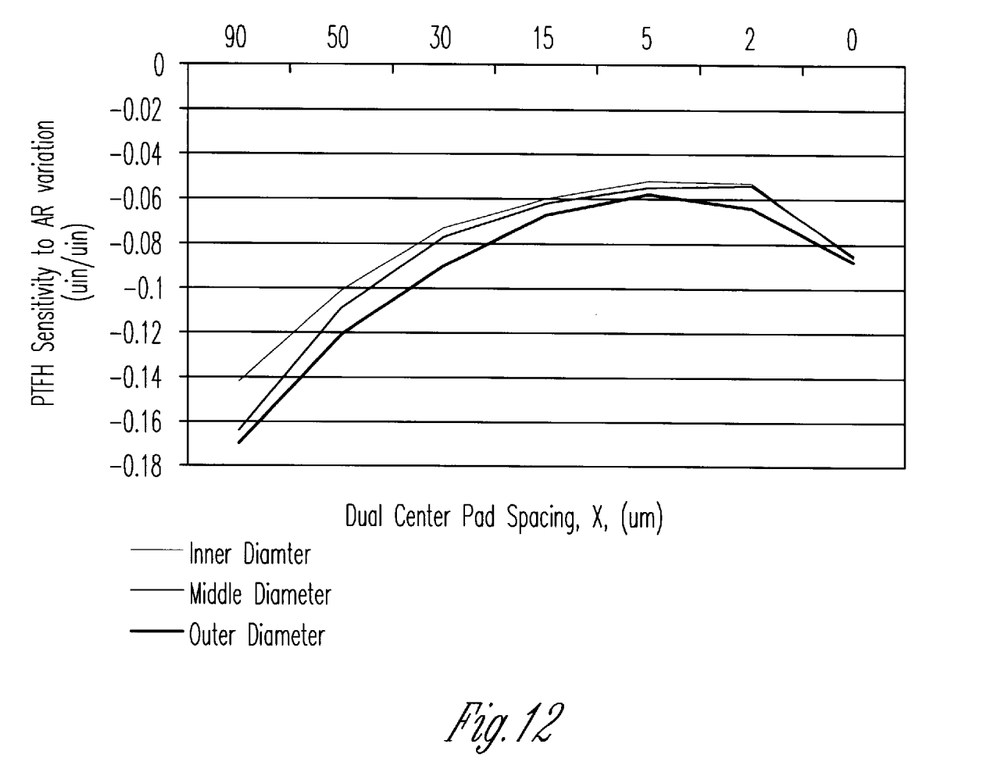
FIG. 12 is a diagram showing the effect spacing between the pads of the dual center pad has on the pole tip fly height sensitivity to alumina recess variation.

FIG. 12 is a diagram which graphically shows the effect of varying the width X between the pads 911,912 of the of the dual center pad in terms of the pole tip fly height sensitivity to alumina recess variation. In other words, FIG. 12 shows the variation in pole tip fly height to alumina recess variation which is caused by varying the spacing between the pads 911, 912. FIG. 12 shows the pole tip fly height sensitivity to alumina recess variation as a function of the trailing edge of the slider for when the slider is positioned at the inner diameter, the outer diameter and at middle diameter with respect to the disc 134. As can be seen, the pole tip fly height sensitivity to alumina recess variation changes only slightly when the distance X is in the range of approximately 2–15 micrometers for the particular slider 126 tested. The channel cavity 980 is typically formed by reactive ion etching the air bearing surface of the slider. The width X can be changed merely by varying the width of the opening in a mask used to perform the reactive ion etch.

Figure 13:
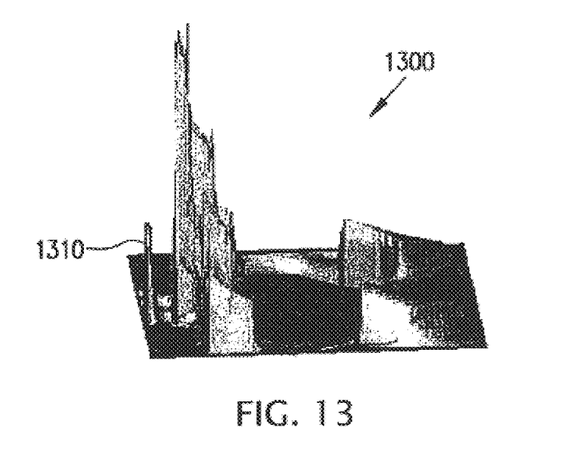
FIG. 13 is a pressure gradient diagram showing the effect a 90 micrometer spacing between the pads of the dual center pad.
Figure 14:
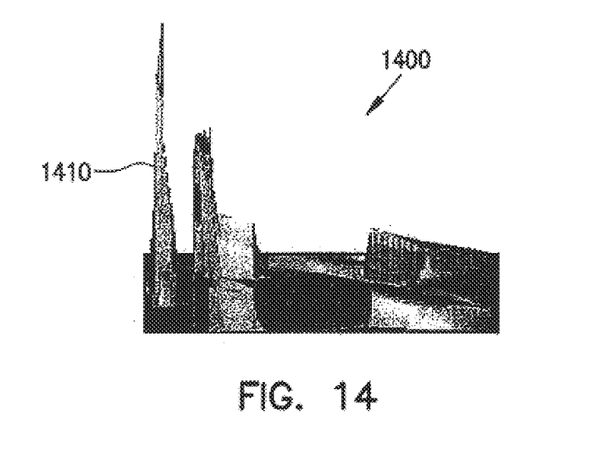
FIG. 14 is a pressure gradient diagram showing the effect a 0 micrometer spacing between the pads of the dual center pad.
Figure 15:
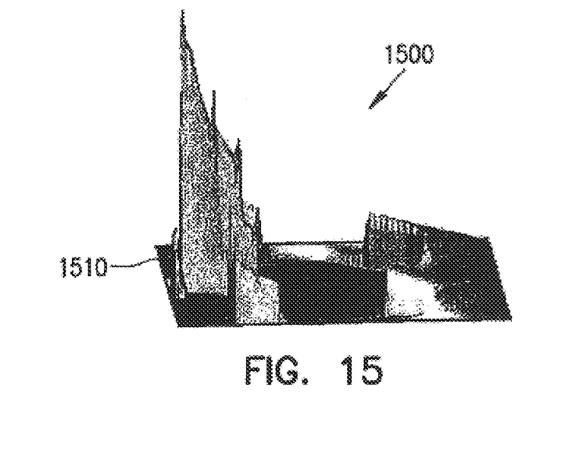
FIG. 15 is a pressure gradient diagram showing the effect a 5 micrometer spacing between the pads of the dual center pad.

FIGS. 13, 14 and 15 show pressure plots associated with the center pad where the distance X is 90 micrometers, 0 micrometers, and 5 micrometers, respectively. FIG. 13 is a pressure gradient diagram 1300 showing the effect a 90 micrometer spacing between the pads of the dual center pad. The pressure gradient diagram 1300 includes several pressure peaks. The pressure of interest is the pressure peak associated with the center pad which is designated 1310. Similarly, FIG. 14 is a pressure gradient diagram 1400 showing the effect a 0 micrometer spacing between the pads of the dual center pad. The pressure gradient diagram 1400 includes several pressure peaks. The pressure of interest is the pressure peak associated with the center pad which is designated 1410. FIG. 15 is a pressure gradient diagram 1500 showing the effect a 5 micrometer spacing between the pads of the dual center pad. The pressure gradient diagram 1500 includes several pressure peaks. The pressure of interest is the pressure peak associated with the center pad which is designated 1510. As can be seen from the pressure gradient diagrams 1300, 1400 and 1500, the pressure peak 1310 associated with center pad having a large X spacing (90 micrometers) and the pressure peak 1410 associated with the center pad having no spacing are higher than the pressure peak 1510 associated with the center pad having an X spacing (5 micrometers) within the range where the pole tip fly height sensitivity to alumina recess variation changes only slightly (distance X is in the range of approximately 2–15 micrometers).

These results are well correlated with pressure profiles of the trailing edge pad or second pad 912 for various values of X, as shown in FIGS. 13, 14 and 15. FIG. 13 shows that for a dual center pad with a large X spacing, pressurization of the back pad, depicted by peak 1310, is significant and therefore expected to influence considerably the pole tip fly height as the height varies as determined by the alumina recession or recess variation. Similarly, FIG. 14 indicates that the single center pad creates conditions where the higher pressure is at the trailing edge portion for which the height varies, as depicted by peak 1410. FIG. 15 shows the dual center pad with an optimized X spacing. In FIG. 15 a very low pressurization, as depicted by peak 1510, of the back pad 912 as opposed to the forward pad 911 is displayed. This minimizes the effect of height variation on the back pad induced by the alumina recession variation.

This study revealed that the alumina recession sensitivity is higher for dual center pad with a channel cavity width above 50 micrometers; however for X lower than 30 micrometers, the alumina recession sensitivity was predicted to be lower. TABLE II, reproduced below, shows the alumina recession sensitivity at the inner diameter, mid diameter, and the outer diameter for a single center pad 310 and dual center pads 910 having various X distances. The optimum distance for alumina recession sensitivity or minimizing alumina recession sensitivity appears to be between 5 to 2 micrometers. Of course this value can be refined as desired with similar analysis procedure for a particular slider design.

TABLE II

Alumina Recession as a Function of Pad Distance, "X"

|  | AR sensitivity ID (uin PTFH per uin AR) | AR sensitivity MD (uin PTFH per uin AR) | AR sensitivity OD (uin PTFH per uin AR) |
| --- | --- | --- | --- |
| Single Center Pad | −0.086 | −0.085 | −0.088 |
| DCP, X = 90 um | −0.142 | −0.164 | −0.170 |
| DCP, X = 50 um | −0.101 | −0.109 | −0.121 |
| DCP, X = 30 um | −0.073 | −0.77 | −0.090 |
| DCP, X = 15 um | −0.060 | −0.062 | −0.067 |
| DCP, X = 05 um | — | — | — |
| DCP, X = 02 um | −0.053 | −0.053 | −0.064 |

Advantageously, slider having a dual center pad with a channel cavity having an optimized width X has low altitude sensitivity. The design controls the alumina recession so that it is less variable and more consistent. The slider air-bearing design also moves the closest point to another area of the slider so that in the presence of fly height variance, there is more leeway before contact between the slider and the disc. The result is more consistent read and write performance characteristics amongst the heads in a disc drive as well as a design that is less sensitive to the amount of alumina recession at the interface between the alumina and the slider.

Figure 18:
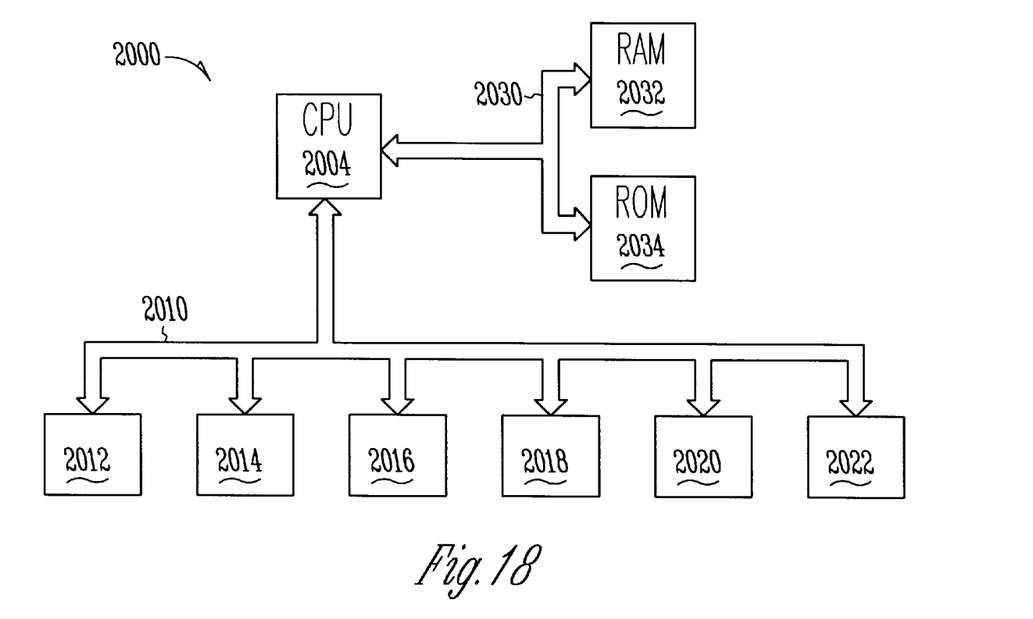
FIG. 18 is a schematic view of a computer system.

FIG. 18 is a schematic view of a computer system. Advantageously, the invention is well-suited for use in a computer system 2000. The computer system 2000 may also be called an electronic system or an information handling system and includes a central processing unit, a memory and a system bus. The information handling system includes a central processing unit 2004, a random access memory 2032, and a system bus 2030 for communicatively coupling the central processing unit 2004 and the random access memory 2032. The information handling system 2002 includes a disc drive device which includes the ramp described above. The information handling system 2002 may also include an input/output bus 2010 and several peripheral devices, such as 2012, 2014, 2016, 2018, 2020, and 2022 may be attached to the input output bus 2010. Peripheral devices may include hard disc drives, magneto optical drives, floppy disc drives, monitors, keyboards and other such peripherals. Any type of disc drive may use the slider having the surface treatment discussed above.

Conclusion

An information handling system, such as a disc drive, includes a base, a disc stack rotatably attached to the base, and an actuator assembly movably attached to the base. The actuator assembly also includes a load spring and a slider attached to said load spring. The slider has an air-bearing surface. The air-bearing surface includes a leading edge, a trailing edge, and a center pad positioned near the trailing edge. A transducer is positioned within the center pad. The center pad has a channel cavity therein. The channel cavity is substantially parallel to the trailing edge. The channel cavity positioned near the transducer. The center pad includes a substrate portion, and a portion covering the trailing edge of the slider which substantially encapsulates the transducer. A transition portion is located between the substrate portion and the portion covering the trailing edge. The channel cavity is positioned near or at the transition portion. In one embodiment of the invention, the channel cavity has a depth substantially equal to the height of the center pad. The channel cavity substantially splits the center pad into a first center pad portion, and a second center pad portion. The first center pad portion is located toward the leading edge, and the second center pad portion is located toward the trailing edge. In some embodiments, the width of the channel cavity is controlled to control the amount of pressure produced by the second center pad portion. In other embodiments, the dimensions of the channel cavity are controlled to control the amount of movement between the substrate portion of the slider and the portion covering the trailing edge of the slider which results from annealing the slider. The air-bearing surface also has a first side rail located between the leading edge and the trailing edge, and a second side rail located between the leading edge and the trailing edge. The invention includes the slider as well as the slider in combination with the disc drive.

A slider 126 has an air-bearing surface. The air-bearing surface 400 includes a leading edge 460, a trailing edge 470, and a center pad 310, 910 positioned near the trailing edge 470, 972. A transducer 150 is positioned within the center pad 310, 910. The center pad 310, 910 has a channel cavity 980 therein. The channel cavity 980 is substantially parallel to the trailing edge 972. The channel cavity 980 is positioned near the transducer 150. The center pad 912 includes a substrate portion 920, and a portion covering the trailing edge 930 of the slider 126 which substantially encapsulates the transducer 150. A transition portion 924 is located between the substrate portion 920 and the portion 930 covering the trailing edge 972. The channel cavity 980 is positioned near or at the transition portion 924. In one embodiment of the invention, the channel cavity 980 has a depth substantially equal to the height of the center pad 910. The channel cavity 980 substantially splits the center pad into a first center pad portion 911, and a second center pad portion 912. The first center pad portion 911 is located toward the leading edge 960, and the second center pad portion 912 is located toward the trailing edge 972. In some embodiments, the width of the channel cavity 980 is controlled to control the amount of pressure produced by the second center pad portion 912. In other embodiments, the dimensions of the channel cavity 980 are controlled to control the amount of movement between the substrate portion 920 of the slider 126 and the portion 930 covering the trailing edge 972 of the slider which results from annealing the slider. The air-bearing surface 900 also has a first side rail 921 located between the leading edge 960 and the trailing edge 972, and a second side rail 922 located between the leading edge 960 and the trailing edge 972.

In a general sense, a slider 126 for disc drive 100 includes a transducer 150 associated with the slider 126 and an air-bearing surface 900 having an apparatus for controlling the amount of fly height variance associated with the slider.

It is to be understood that the above description is intended to be illustrative, and not restrictive. Many other embodiments will be apparent to those of skill in the art upon reviewing the above description. The scope of the invention should, therefore, be determined with reference to the appended claims, along with the full scope of equivalents to which such claims are entitled.

What is claimed is:

1. A slider for a disc drive comprising:
   an air-bearing surface which includes:
   a leading edge;
   a trailing edge;
   a center pad positioned near the trailing edge; and
   a transducer within the center pad, the center pad having a channel cavity therein which is substantially parallel to the trailing edge, is positioned near the transducer, and substantially splits the center pad into a first center pad and a second center pad.

2. The slider of claim 1 wherein the center island is further comprised of:
   a substrate portion;
   a portion covering the trailing edge of the slider which substantially encapsulates the transducer; and
   an interface portion between the substrate portion, covering the trailing edge, and near the channel cavity.

3. The slider of claim 1 wherein the trench has a depth substantially equal to the height of the center island.

4. The slider of claim 1 wherein the first center pad portion is located toward the leading edge and the second center island portion in located toward the trailing edge.

5. The slider of claim 4 wherein the width of the channel cavity is controlled to control the mount of pressure produced by the second center pad portion.

6. The slider of claim 4 wherein the air-bearing surface further comprises:
   a first side rail located between the leading edge and the trailing edge; and
   a second side rail located between the leading edge and the trailing edge.

7. The slider of claim 4 wherein the dimensions of the channel cavity are controlled to control the amount of movement between the substrate portion of the slider and the portion covering the trailing edge of the slider which results from annealing the slider.

8. A disc drive comprising:
   a base;
   a disc rotatably attached to the base;
   an actuator attached to the base, the base also including:
   a slider having:
   an air-bearing surface which includes:
   an air-bearing surface which includes:
   a leading edge;
   a trailing edge;
   a center pad positioned near the trailing edge; and
   a transducer within the center pad, the center pad having a channel cavity therein which is substantially parallel to the trailing edge, is positioned near the transducer and substantially splits the center pad into a first center pad and a second center pad.

9. The disc drive of claim 8 wherein the center island is further comprised of:
   a substrate portion;
   a portion covering the trailing edge of the slider which substantially encapsulates the transducer wherein the channel cavity is between the substrate portion and the portion covering the trailing edge.

10. The disc drive of claim 8 wherein the width of the channel cavity is controlled to control the amount of pressure produced by the second center pad portion.

11. The disc drive of claim 8 wherein the dimensions of the channel cavity are controlled to control the amount of movement between the substrate portion of the slider and the portion covering the trailing edge of the slider which results from annealing the slider.

12. A slider for a disc drive information handling system comprising:

a transducer associated with the slider;

an air-bearing surface further comprising means for controlling the amount of fly height variance associated with the slider.

13. The slider of claim 12 wherein the means for controlling the amount of fly height variance includes a step in a centerpad of the air-bearing surface.

14. The slider of claim 12 wherein the means for controlling the amount of fly height variance includes a channel cavity in a centerpad of the air-bearing surface.

* * * * *

UNITED STATES PATENT AND TRADEMARK OFFICE
CERTIFICATE OF CORRECTION

PATENT NO. : 6,639,755 B2  Page 1 of 1
APPLICATION NO. : 09/866519
DATED : October 28, 2003
INVENTOR(S) : Boutaghou et al.

It is certified that error appears in the above-identified patent and that said Letters Patent is hereby corrected as shown below:

In column 12, line 33, please change:

"mount of pressure"

to:

-- amount of pressure --

Signed and Sealed this

First Day of May, 2007

JON W. DUDAS
*Director of the United States Patent and Trademark Office*